United States Patent [19]
Mizuse et al.

[11] Patent Number: 5,476,705
[45] Date of Patent: Dec. 19, 1995

[54] CORNER STRUCTURE OF RESINOUS MOLDED PART

[75] Inventors: Susumu Mizuse; Naoto Taguchi, both of Shizuoka, Japan

[73] Assignee: Yazaki Corporation, Japan

[21] Appl. No.: 262,900

[22] Filed: Jun. 21, 1994

[30] Foreign Application Priority Data

Jun. 22, 1993 [JP] Japan ..................... 5-150179

[51] Int. Cl.⁶ ..................... B32B 9/00
[52] U.S. Cl. ..................... 428/119; 428/58; 428/60; 428/63; 428/120; 428/132; 428/136; 428/161; 428/192; 428/542.8; 264/138; 264/318
[58] Field of Search ..................... 428/120, 110, 428/122, 125, 132, 136, 192, 172, 542.8, 60, 58, 63, 161; 264/138, 318

[56] References Cited

U.S. PATENT DOCUMENTS

| | | | |
|---|---|---|---|
| 3,551,940 | 1/1971 | Edison | 220/339 |
| 3,816,181 | 6/1974 | Buckethal | 136/166 |
| 3,907,193 | 9/1975 | Heller | 229/16 |
| 4,341,307 | 7/1982 | Shyers | 206/387 |
| 4,430,370 | 2/1984 | Gallagher | 428/35 |

Primary Examiner—Patrick J. Ryan
Assistant Examiner—Abraham Bahta
Attorney, Agent, or Firm—Wigman, Cohen, Leitner & Myers

[57] ABSTRACT

A corner structure of a resinous molded part includes a base portion and a pair of lever portions which are formed integrally with the base portion. The molded part is provided with cut-outs which are arranged at corners where the base portion intersects the lever portions. A thickness of a portion outside the recess is established to be larger than a thickness of another portion inside the cut-out. With the establishment of the thickness, the amount of the inward inclination of the lever portions derived from the differential shrinkage can be reduced since they are pulled outwardly due to the increased thickness of the outside portion, when the part is cooled.

14 Claims, 5 Drawing Sheets

| | CONNECTOR 1st. EMBODIMENT | CONNECTOR TO BE COMPARED NO.1 |
|---|---|---|
| INCLINATION (G−H) | 0.25 | 1.83 |

| | CONNECTOR 2nd. EMBODIMENT | CONNECTOR TO BE COMPARED NO.2 |
|---|---|---|
| INCLINATION (I—J) | 0.14 | 1.64 |

5,476,705

CORNER STRUCTURE OF RESINOUS MOLDED PART

BACKGROUND OF THE INVENTION

This invention relates to a resinous molded part, and more particularly, to a corner structure thereof.

Generally, in the resinous molded part, there is existing a problem of shrinkage thereof after molding. For example, in case of a substantially C-shaped electrical connector having a base portion and a pair of lever portions connected with both ends of the base portion to extend perpendicularly thereto, respectively, there is a possibility that the lever portions are inclined inwardly so that a distance therebetween are shorter than a predetermined dimension. Consequently, there would be raised a problem that the connector shrunk in this way cannot satisfy various functions required as the complete electrical connector. It should be noted that the reason why the lever portions are so inclined is that both of the lever portions are urged inwardly to approach to each other because of differential shrinkage. Thus, as the part cools to room temperature, shrinkage rates vary throughout the part depending upon the local thickness of the part. In the above-mentioned connector, since a thickness of the part at corners where the respective lever portion connects with the base portion is particularly large in comparison with the other portions, a shrinkage rate of an inside of each corner is apt to be larger than that of an outside thereof.

In order to reduce such differential shrinkage therebetween, U.S. Pat. No. 4,430,370, which is relevant to Japanese Unexamined Patent Publication (Kokai) No.57-201635, discloses a resinous molded part provided at each corner with a groove to decrease a thickness of the part thereof. However, in case that the grooves are respectively provided at the corners of the part in this way, it would have a disadvantage that the strength of the part is lowered at the corners.

SUMMARY OF THE INVENTION

It is an object of the present invention to provide a corner structure of a resinous molded part capable of reducing the inward inclination of the lever portions derived from the above-mentioned differential shrinkage while the strength of the part can be maintained at the corners, sufficiently.

The objects of the invention described above can be accomplished by a corner structure of a resinous molded part, comprising:

a base portion; and at least one lever portion formed integrally with the base portion to extend from an end of said base portion along a direction insersecting the extending direction of the base portion, the molded part having a cut-out formed at a corner where the base portion connects with the lever portion, a thickness of a portion outside the cut-out being larger than a thickness of another portion inside the cut-out.

In the present invention, with the relationship in thickness between the outside portion and inside portion, the shrinkage rate of the outside portion becomes to be larger than that of the inside portion. Consequently, when cooling after molding, the lever portion is pulled outwardly due to the increased shrinkage rate of the outside portion, so that a tendency of the inward inclination of the leg portion can be reduced by cancellation of the outside shrinkage with the inside shrinkage. Furthermore, the inside portion serves as a reinforced rib at the corner, whereby the reduction in strength caused by the provision of the cut-out can be restrained.

In the preferred embodiment of the present invention, the cut-out is defined by a bottom surface to provide a recess structure. Due to the structure, the strength of the corner can be maintained to be prevent from lowering.

In one form of the present corner structure, the cut-out is formed in such a manner that the resinous material is partially scraped along a direction perpendicular to the protruding direction of the lever portion.

In another form of the present corner structure, the cut-out is formed in such a manner that the resinous material of said part is partially scraped along a protruding direction of said lever portion.

These and other objects and features of the present invention will become more fully apparent from the following description and appended claims taken in conjunction with the accompanying drawings.

DESCRIPTION OF THE PREFERRED EMBODIMENT

Two embodiments of the present invention are now described with reference to the drawings.

Figure 1:
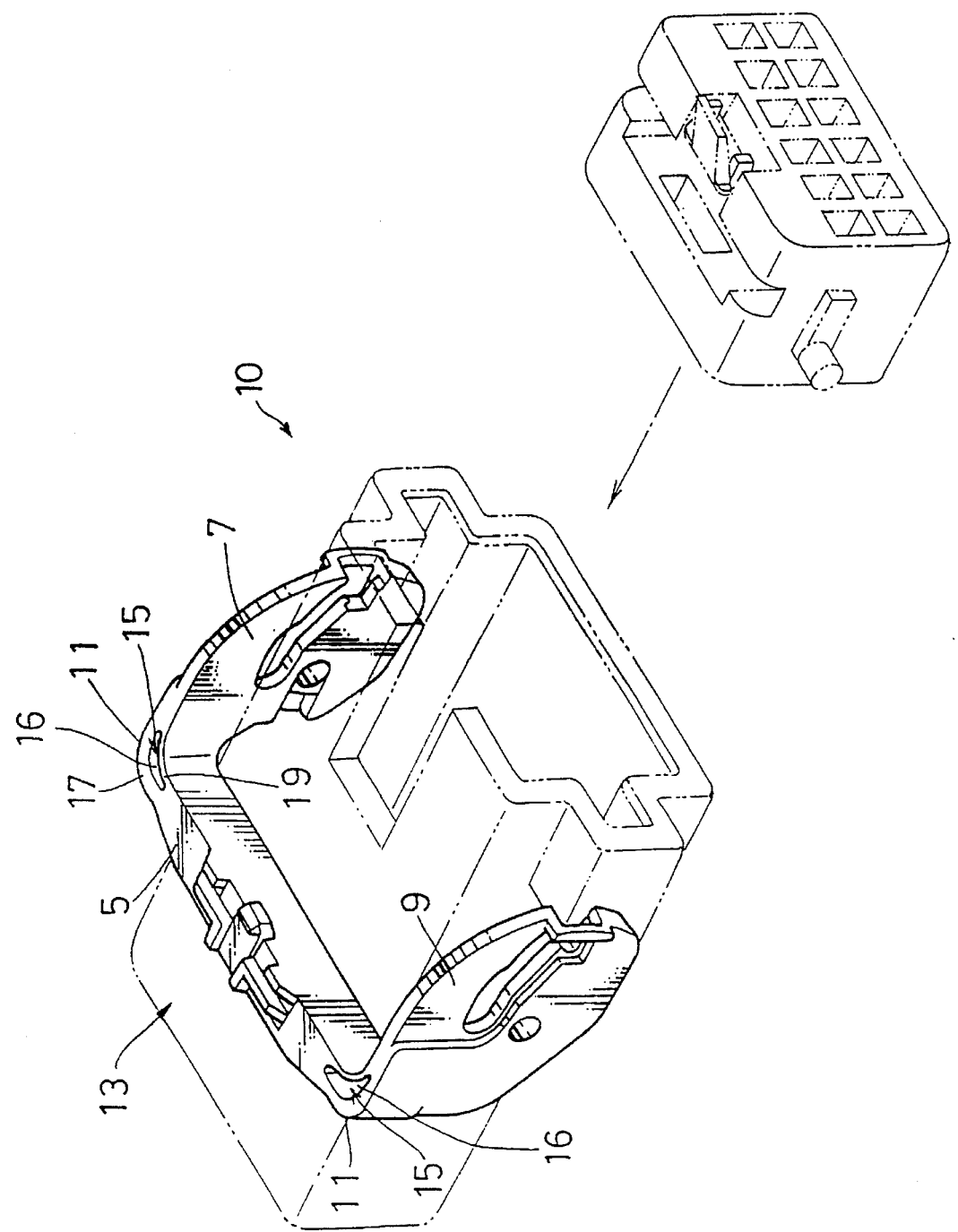
FIG. 1 is a perspective view showing a connector requiring a low insertion force with a corner structure according to an embodiment of the present invention.

FIG. 1 shows a connector 10 of low insertion force type with a corner structure according to a first embodiment of the present invention. As shown in FIG. 1, the connector 10 is constituted by a lever 13 comprising a base portion 5 and a pair of lever portions 7 and 9 which are connected to both ends of the base portion 5, respectively. The lever 13 is provided at both corners 11 thereof with cut-outs 15. Each cut-out 15 is shaped to be a recess of a predetermined depth.

Figures 2, 3:
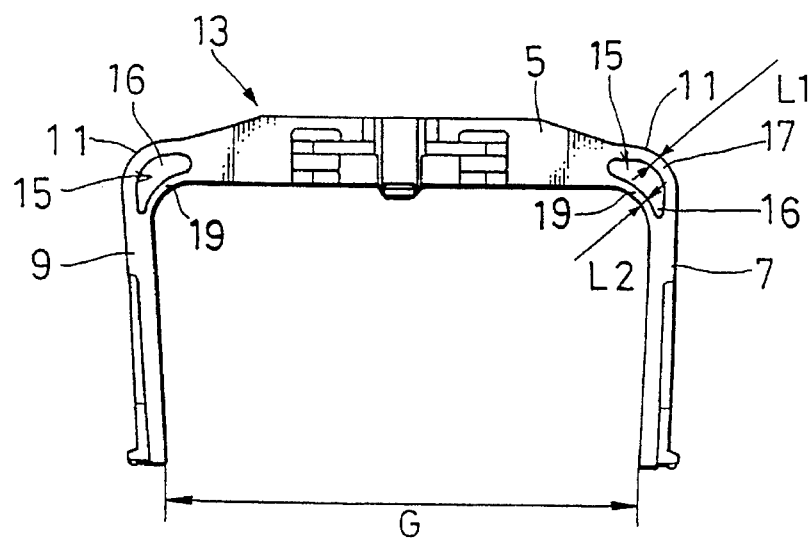
FIG. 2 is a plan view of the connector of FIG. 1.
FIG. 3 is a diagram in which the inclination of the connector of FIG. 1 is compared with that of the connector having no cut-out.

As clearly shown in FIG. 2, each cut-out 15 has the largest width (or the widest sectional area) at a position where the base portion 5 connects with the lever portion 7 or 9. Each cut-out 15 is shaped in such a manner that the width is gradually decreased as it approaches the base portion 5 and the lever portion 7 or 9, whereby the cut-out 15 has a substantially crescent cross-section. Further, a thickness L1 of a portion 17 positioned outside the cut-out 15 is adapted to be larger than a thickness L2 of another portion 19 positioned inside the cut-out 15. Note that, in this specification, the portion 17 will be referred as "the outside portion 17" while the portion 19 will be referred as "the inside portion 19", hereinafter. In the direction of depth of the cut-out 15, it is defined by a bottom surface 16 to have a predetermined depth.

With the arrangement mentioned above, in case of cooling the connector 10 after molding the lever 13, the shrinkage of the outside portion 17 is larger than that of the inside portion 19, so that the lever portions 7 and 9 are pulled outwardly thereby to be apart from each other. Consequently, even if the inward force caused by the shrinkage of the inside portion 19 is applied on the lever portion 7 and 9, an amount of the inward inclnation can be reduced by cancellation of the outward force with the inward force on the lever portions 7 and 9.

Figure 7A:
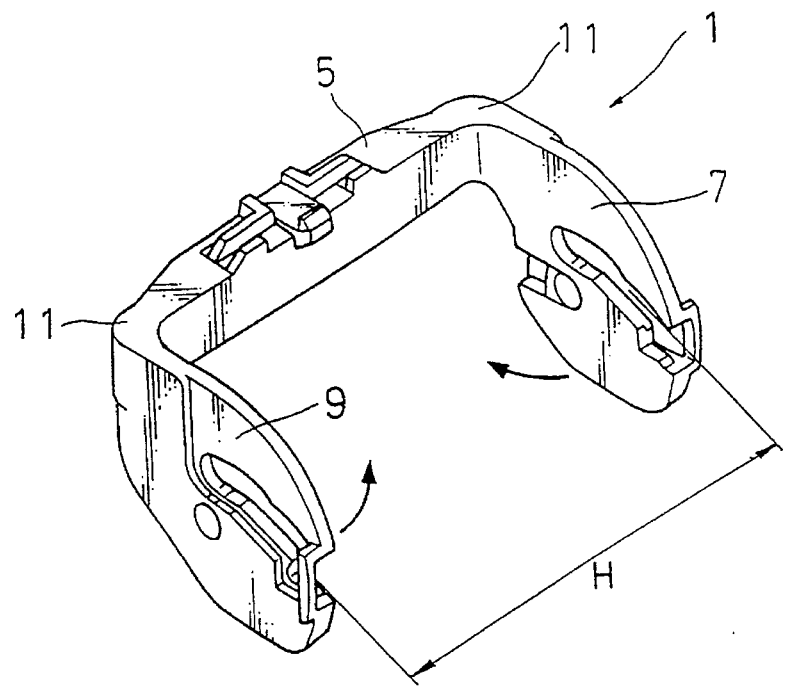
FIG. 7A is a perspective view showing a connector having no cut-out to be compared with the connector of FIG. 1

FIG. 3 shows a result of our molding test to compare the above-mentioned connector 10 having the cut-outs 15 with a connector having no cut-out as shown in FIG. 7A. The result is that the former exhibits the inclination of 0.25 mm, while the latter has the inclination of 1.83 mm. Note that, in the molding test, the lever 13 was made of polybuthelene terephthalete and the molding was carried out under conditions as below.

Temperature of cylinder: 250° C.
Temp. of molding die : 25° C.
Molding machine: 40 tons type (manufactured by Nissei Co., Ltd.)

The result of test suggests that the present connector 10 provided with the cut-outs 15 has come to a sharp reduction in the inward inclination of the lever portions 7 and 9 in comparison with the connector with no cut-out.

According to the embodiment of the invention, each of the inside portions 19 operates as a reinforced rib at each corner 11, whereby the reduction in strength caused by the provision of the cut-outs 15 can be restrained. Furthermore, since the respective cut-out 15 is defined by the bottom surface 16 to have a configuration of recess, the strength of the corner 11 can be maintained to be prevented from lowering sharply.

In conclusion, according to the first embodiment, while maintaining the strength at the corner of the part, it is possible to reduce the inward inclination of the lever portions (side walls) caused by the differential shrinkage, comparing with the connector provided with no cut-out.

Figure 4:
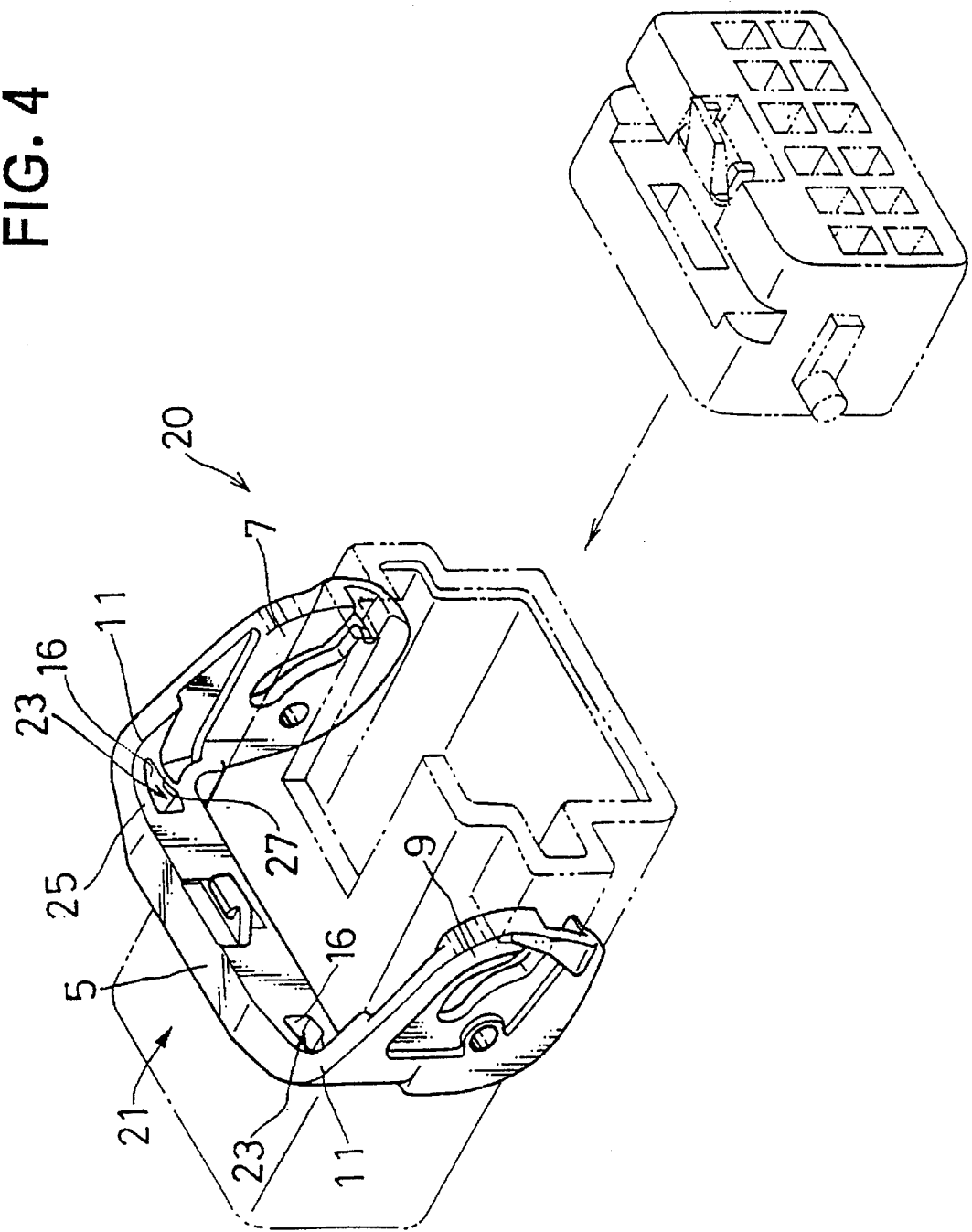
FIG. 4 is a perspective view showing a connector requiring a low insertion force with a corner structure according to another embodiment of the present invention.

FIG. 4 shows a connector 20 with a corner structure according to a second embodiment of the present invention.

Although the cut-outs 15 in the previous embodiment are formed in such a manner that the resinous material is partially scraped along a direction perpendicular to the protruding direction of the lever portions 7 and 9, a lever 21 of FIG. 4 has two cut-outs 23 formed on the internal surface of the base portion 5 along the protruding directions of the lever portions 7 and 9, respectively. Also in this case, a thickness of a portion 25 outside of each cut-out 23, which is positioned upward of the cut-out 23 in FIG. 4, is established to be larger than a thickness of a portion 27 inside of each cut-out 23, which is positioned downward of the respective cut-out 23 in the figure. Additionally, not penetrating the base portion 5, each cut-out 15 is defined by the bottom surface 16 to have a predetermined depth.

With the arrangement mentioned above, when the connector 20 is cooled after molding, the tendency of the inward inclination of the lever portions 7 and 9 can be reduced since they are pulled outwardly so as to be apart from each other by the force derived from the differential shrinkage between the outside portion 25 and inside portion 27.

Figures 5, 6:
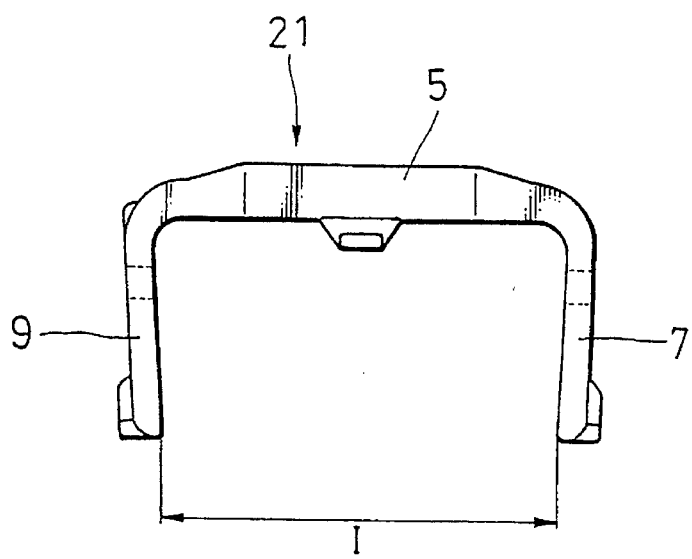
FIG. 5 is a plan view of the connector of FIG. 4.
FIG. 6 is a diagram in which the inclination of the connector of FIG. 4 is compared with that of the connector having no cut-out.
Figure 7B:
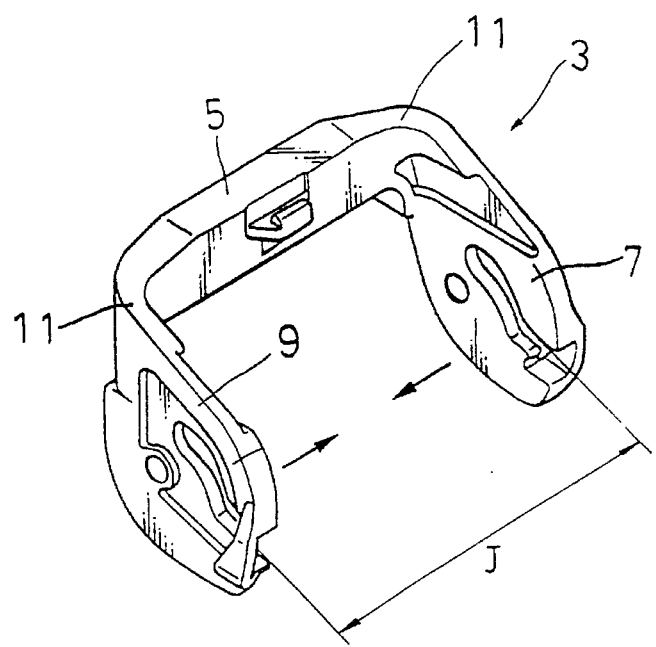
FIG. 7B is a perspective view showing another connector having no cut-out to be compared with the connector of FIG. 4.

FIG. 6 shows a result of our molding test to compare the connector 20 having the cut-outs 23 with a connector having no cut-out as shown in FIG. 7B. In the table, the former exhibits the inclination of 0.14 mm while the latter has the inclination of 1.64 mm. With the result, it will be understood that, also in the second embodiment, the connector 20 provided with the cut-outs 23 has come to a sharply reduction in the inward inclination of the lever portions 7 and 9 in comparison with the connector with no cut-outs. Furthermore, since the respective cut-out 23 is defined by the bottom surface 16 to have a configuration of recess, the strength of the corner 11 can be maintained to be prevented from lowering sharply.

In common with the afore-mentioned embodiments, since a cut-out is provided at a corner of a connector in such a manner that a thickness of a portion outside of each cut-out is larger than the thickness of the other portion inside thereof, it is possible to reduce the inward inclination of a lever portion of the connector when cooling, while maintaining the strength of the corner itself.

Finally, it will be understood by those skilled in the art that the forgoing description of the preferred embodiments of the disclosed structure, and that various changes and modifications may be made to the present invention without departing from the spirit and scope thereof.

What is claimed is:

1. In a part molded of resinous matter, a corner structure comprising a transition from a generally planar base portion to a generally planar lever portion extending normal to the base portion and having a free end, said corner structure further having a continuous inner wall extending from the base portion along the lever portion and a continuous outer wall which extends from the base portion along the lever portion, and having a void disposed in the resinous matter between the inner wall and the outer wall which void extends along at least a portion of an intersection of the base portion and the lever portion, wherein the void separates the inner and outer walls at the intersection into inner and outer portions having thickness characteristics, and wherein the outer wall portion is thicker than the inner wall.

2. The corner structure of claim 1, wherein said void is further defined by a bottom surface thereby to provide a recess.

3. The corner structure of claim 2, wherein said void is formed in such a manner that the resinous material is at least partially absent along a direction perpendicular to the extension direction of said lever portion.

4. The corner structure of claim 3, wherein said void is of a substantially crescent cross-sectional shape.

5. The corner structure of claim 2, wherein said void is formed in such a manner that the resinous material of said part is at least partially absent along the extension direction of said lever portion.

6. The corner structure of claim 1, wherein said resinous molded part is an electric connector.

7. The corner structure of claim 2, wherein said resinous molded part is an electric connector.

8. The corner structure of claim 3, wherein said resinous molded part is an electric connector.

9. The corner structure of claim 4, wherein said resinous molded part is an electric connector.

10. The corner structure of claim 5, wherein said resinous molded part is an electric connector.

11. In a part molded of resinous matter, a corner structure comprising a transition at an apex from a generally planar base portion to a generally planar lever portion extending normal to the base portion and having a free end, said corner structure further having a generally continuous inner wall surface extending from the base portion along the lever portion and a continuous outer wall surface portion which extends from the base portion along the lever portion, and having a void in the resinous matter disposed in the inner wall surface extending toward the outer wall surface normal to the apex, wherein the base portion has upper and lower edges, and wherein the void is displaced from a centerline parallel to the upper and lower edges.

12. In a part molded of resinous matter, a pair of first and second corner structures, each comprising a transition from a generally planar base portion to a generally planar lever portion extending normal to the base portion and each lever portion having a free end, said corner structures further having a continuous inner wall extending from the base portion along the lever portions and a continuous outer wall portion which extends from the base portion along the lever portions, each of the first and second corner structures having a void in the resinous matter between the inner wall and the outer wall wherein the first and second voids extend along at least a portion of first and second intersections of the base portion and the first and second lever portions, respectively, wherein the each of the respective voids separates the inner and outer walls at the respective intersection into inner and outer portions having thickness characteristics, and wherein the outer wall portion is thicker than the inner wall.

13. The corner structure of claim 12, wherein the inner wall and the outer wall thickness characteristics of each corner structure have a ratio such that cooling of the corner structure in the molding process results in limited displacement apart of the first and second lever portion free ends.

14. The corner structure of claim 12, wherein the inner wall and the outer wall thickness characteristics of each corner structure have a ratio such that cooling of the corner structure in the molding process results in limiting movement together of the first and second lever portion free ends.

* * * * *